US007515933B2

(12) United States Patent
Oesterling et al.

(10) Patent No.: US 7,515,933 B2
(45) Date of Patent: Apr. 7, 2009

(54) METHOD AND SYSTEM FOR OPERATING A DEGRADED VEHICLE COMMUNICATION UNIT

(75) Inventors: Christopher L. Oesterling, Troy, MI (US); Mazen K. Alsliety, Troy, MI (US)

(73) Assignee: General Motors Corporation, Detroit, MI (US)

( * ) Notice: Subject to any disclaimer, the term of this patent is extended or adjusted under 35 U.S.C. 154(b) by 743 days.

(21) Appl. No.: 10/667,626

(22) Filed: Sep. 22, 2003

(65) Prior Publication Data

US 2005/0064895 A1 Mar. 24, 2005

(51) Int. Cl.
*H04M 1/00* (2006.01)

(52) U.S. Cl. .................. 455/553.1; 455/41.2; 455/297; 455/345

(58) Field of Classification Search ................ 455/297, 455/345, 553.1, 11.1, 41.2
See application file for complete search history.

(56) References Cited

U.S. PATENT DOCUMENTS 5,612,948 A * 3/1997 Fette et al. .................. 370/252
6,151,510 A * 11/2000 Zicker ..................... 455/414.1
6,493,629 B1 12/2002 Van Bosch
6,925,378 B2 * 8/2005 Tzamaloukas .............. 701/200
6,947,732 B2 * 9/2005 Fraser ........................ 455/420
2004/0142678 A1 7/2004 Krasner
2005/0181725 A1 * 8/2005 Dabak et al. ............... 455/41.2

* cited by examiner

*Primary Examiner*—Nay A Maung
*Assistant Examiner*—Tuan H Nguyen

(57) ABSTRACT

A method is directed to operating a degraded vehicle communication unit within a mobile vehicle communication system (MVCS). The method provides for determining a primary communication mode failure, initiating a secondary communication mode responsive to the primary communication mode failure determination, and operating a telematics device in the secondary communication mode within the vehicle communication unit. The step of determining the primary communication mode failure may include detecting if the telematics unit can not initiate contact with a wireless carrier system, and detecting if the telematics unit can not maintain communication with the wireless carrier system. The step of determining the primary communication mode failure may include determining a GPS unit within the vehicle communication unit is unable to receive a GPS satellite broadcast from a GPS satellite broadcast system.

18 Claims, 3 Drawing Sheets

METHOD AND SYSTEM FOR OPERATING A DEGRADED VEHICLE COMMUNICATION UNIT

FIELD OF THE INVENTION

In general, the invention relates to Global Positioning System (GPS) transmissions as well as data transmission over a wireless communication system. More specifically, the invention relates to a method and system for operating a degraded in-vehicle communication unit within a mobile vehicle communication system.

BACKGROUND OF THE INVENTION

Mobile communication units (MCU's), such as cellular phones, personal data assistants (PDA's), and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

Once the radio communication link between the MCU and the cellular base station has been established, the base station then utilizes a combination of additional cellular stations, conventional telephone wire line networks, and possibly even satellite systems to connect the MCU to the number to be called.

Wireless communication services for MCU users, such as navigation and roadside assistance that utilize GPS, have increased rapidly in recent years. Most of the services that have been offered are for a motor vehicle in operation, and include services that may require location and destination information, usually provided utilizing GPS data.

Examples of roadside assistance that utilize GPS, in addition to other wireless communication services, include providing location information in emergency situations, such as, for example automobile accidents, medical emergencies, and automobile theft. Unfortunately, in many instances of the above examples one or more critical portions, such as, for example the antenna portion or the power supply portion, of the MCU may be degraded. In the event of an automobile accident scenario, the degradation may be unintentional as opposed to an intentional degradation in the event of an automobile theft scenario.

It would be desirable, therefore, to provide a method and system that would overcome these and other disadvantages.

SUMMARY OF THE INVENTION

One aspect of the invention includes a method for operating a vehicle communication unit within a mobile vehicle communication system. The method includes determining a primary communication mode failure, initiating a secondary communication mode responsive to the primary communication mode failure determination, and operating a telematics device in the secondary communication mode within the vehicle communication unit.

In accordance with another aspect of the invention, a computer readable medium storing a computer program includes: computer readable code for determining a primary communication mode failure; computer readable code for initiating a secondary communication mode responsive to the primary communication mode failure determination; and computer readable code for operating a telematics device in the secondary communication mode within a vehicle communication unit.

In accordance with yet another aspect of the invention, a system for operating a vehicle communication unit within a mobile vehicle communication system is provided. The system includes means for determining a primary communication mode failure. Means for initiating a secondary communication mode responsive to the primary communication mode failure determination is provided. Means for operating a telematics device in the secondary communication mode within the vehicle communication unit is also provided.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
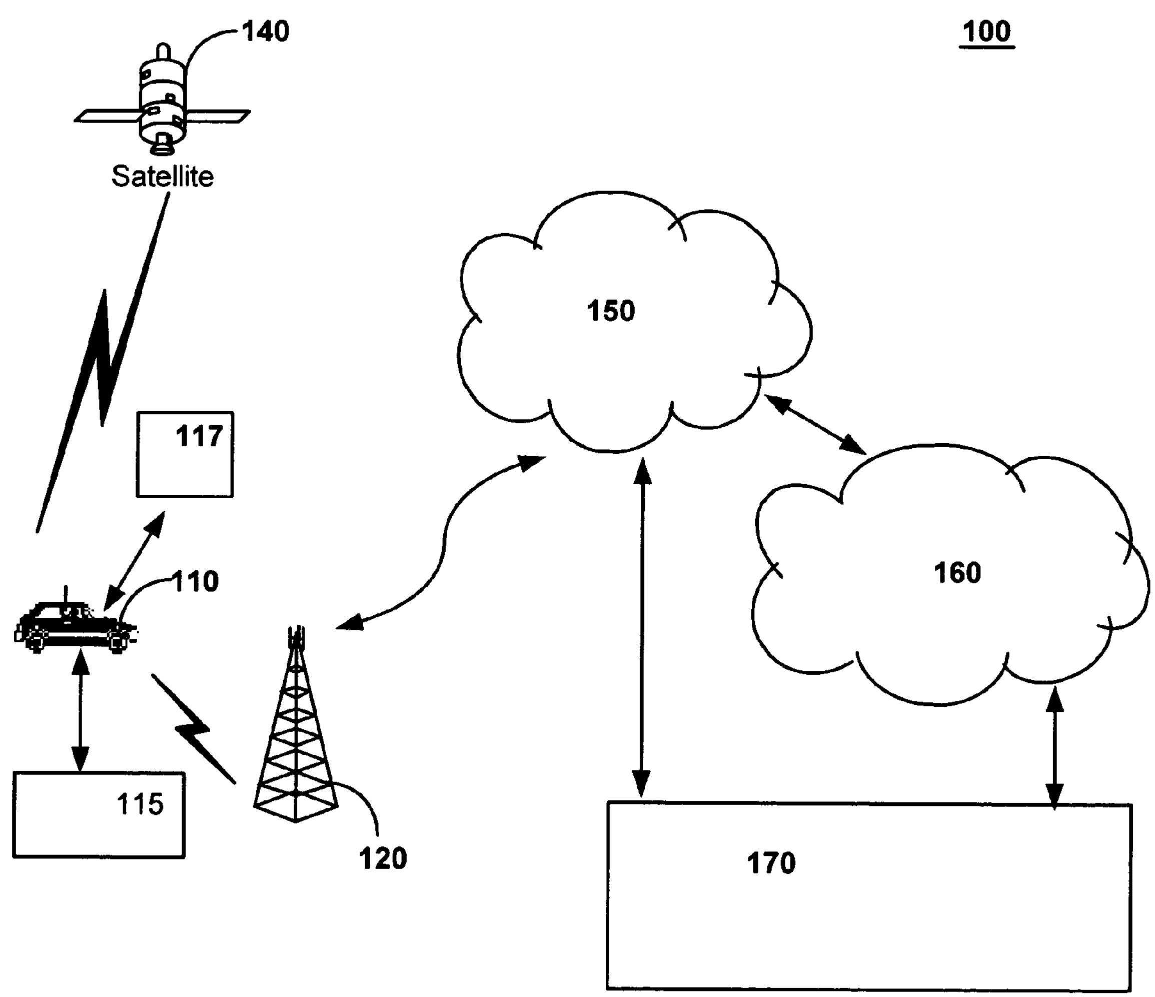
FIG. 1 is a block diagram illustrating an operating environment according to an embodiment of the present invention.

FIG. 1 is a block diagram illustrating an example of an operating environment that is in accordance with the present invention. FIG. 1 details an embodiment of a system for operating a global positioning service and a wireless communication service in a mobile vehicle, in accordance with the present invention, and may be referred to as a mobile vehicle communication system (MVCS) 100. The mobile vehicle communication system (MVCS) 100 includes one or more mobile vehicle communication units (MVCU) 110, one or more wireless communication systems 120, one or more GPS satellite broadcast systems 140, one or more communication networks 150, one or more land networks 160, and one or more service providers 170. MVCU 110 includes telematics device 115 and global positioning system (GPS) unit 117 as well as additional components not relevant to the present discussion. MVCS 100 may include additional components not relevant to the present discussion.

In one example, MVCS 100 is implemented as an OnStar system, as is known in the art, with regards to wireless communications, and as a GPS system, as is known in the art, with regards to satellite and radio GPS communications. MCVU 110 may also be referred to as a mobile vehicle throughout the discussion below. In operation, MCVU 110 may be implemented as a motor vehicle, a marine vehicle, or as an aircraft.

Telematics unit 115 is a wireless vehicle communication device/module that includes an analog or digital phone with suitable hardware and software for transmitting and receiving data communications. In operation, telematics unit 115, within MCVU 110, sends to and receives radio transmissions from wireless communication system 120.

In one embodiment, telematics unit 115 further includes a wireless modem for transmitting and receiving data. In another embodiment, telematics unit 115 includes a digital signal processor with software and additional hardware to enable communications between the mobile vehicle and MVCS 100, and to perform other routine and requested services.

Additionally, MCVU 110 includes global positioning system (GPS) unit 117 that receives broadcasts from GPS satellite broadcast system 140. GPS unit 117 is capable of determining synchronized time and a geophysical location of the mobile vehicle based on the received broadcasts. In other embodiments, one or more of the above described components, such as, for example the wireless modem are implemented as independent components that are interfaced with telematics unit 115 to provide necessary functionality. In yet another embodiment, one or more of the above described components, such as, for example GPS unit 117 are implemented as integrated components within telematics unit 115 to provide necessary functionality.

Telematics unit 115 and GPS unit 117 include hardware suitable for receiving broadcast signals within MCVU 110. In one embodiment, telematics unit 115 includes a receiver that receives broadcasts from wireless communication system 120 and GPS unit 117 includes a GPS receiver that receives GPS broadcasts from GPS satellite broadcast system 140.

In another embodiment, telematics unit 115 and GPS unit 117 further include a medium for storing programming information. In an example, the programming information includes provider supplied programs. Supplied programs may include such programs as GPS reception, navigation, diagnostic, and the like.

In another embodiment, MCVU 110 includes an automatic speech recognition system (ASR) module capable of communicating with telematics unit 115. In yet another embodiment, the module is capable of functioning as any part or all of the above communication devices and, for another embodiment of the invention, may be capable of data storage, and/or data retrieval, and/or receiving, processing, and transmitting data queries. In one example, MVCS device 115 includes an ASR module.

Wireless communications system 120 is a wireless communications carrier or a mobile telephone system and transmits to and receives signals from one or more MCVU 110. Wireless communication system 120 incorporates any type of telecommunications in which electromagnetic waves carry signal over part of or the entire communication path. In one embodiment, wireless communication system 120 is implemented as any type of broadcast communication in addition to GPS satellite broadcast system 140.

In one example, such wireless communication system 120 is a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another embodiment, the wireless communication system 120 operates using a Dedicated Short Range Communication (DSRC) standard.

In another example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

GPS satellite broadcast system 140 transmits radio signals to GPS unit 117 within MCVU 110. In one embodiment, GPS satellite broadcast system 140 may broadcast over a spectrum in the "L" band (1.575 GHz) that has been allocated by the U.S. Federal Communications Commission (FCC) for nationwide broadcasting of GPS satellite-based services. In an example, GPS satellite broadcast system 140 may be implemented as a global positioning service (GPS). In operation, broadcast services provided by GPS satellite broadcast system 140 are received by GPS unit 117 located within MCVU 110.

Communications network 150 is implemented as any suitable system or collection of systems for connecting wireless communications system 120 to at least one MCVU 110 or to a service provider 170. In one embodiment, communications network 150 includes a mobile switching center and provides services from one or more wireless communications companies.

Land network 160 connects communications network 150 to service provider 170. In one embodiment, land network 160 is implemented as a public-switched telephone network, a wired network, an optical network, a fiber network, another wireless network, or any combination thereof. In an example, land network 160 includes an Internet protocol (IP) network. In another embodiment, an MCVU 160 utilizes all or part of the wireless communications system 120, communications network 150, and land network 160.

In yet another embodiment, land network 160 connects one or more communications systems 120 to one another. In another embodiment, communication network 150 and land network 160 connect wireless communications system 120 to a communication node or service provider 170.

Service provider 170 is implemented as one or more locations where communications may be received or originate to facilitate functioning of the mobile vehicle communication system (MCVS) 100. Service provider 170 may contain any of the previously described functions.

In one embodiment, service provider 170 is implemented as a call center, as known in the art. In an example, the call center is implemented as a voice call center, providing verbal communications between an advisor in the call center and a subscriber in a mobile vehicle. In another example, the call center is implemented as a voice activated call center, providing verbal communications between an ASR unit and a subscriber in a mobile vehicle. In yet another example, the call center is implemented as a virtual call center, providing virtual communications between a virtual advisor and a user interface. In another embodiment, the call center contains any of the previously described functions.

In an example, the call center is implemented to service an OnStar system. In yet another example, the call center is implemented to service one or more of the above examples, or other services.

In operation, a service provider 170 utilizes one or more portions of the aforementioned communications network to communicate GPS data and service provider programming to telematics unit 115 and GPS unit 117. The provider programming may then be utilized by telematics unit 115 and GPS unit 117 to implement the present invention.

Figure 2:
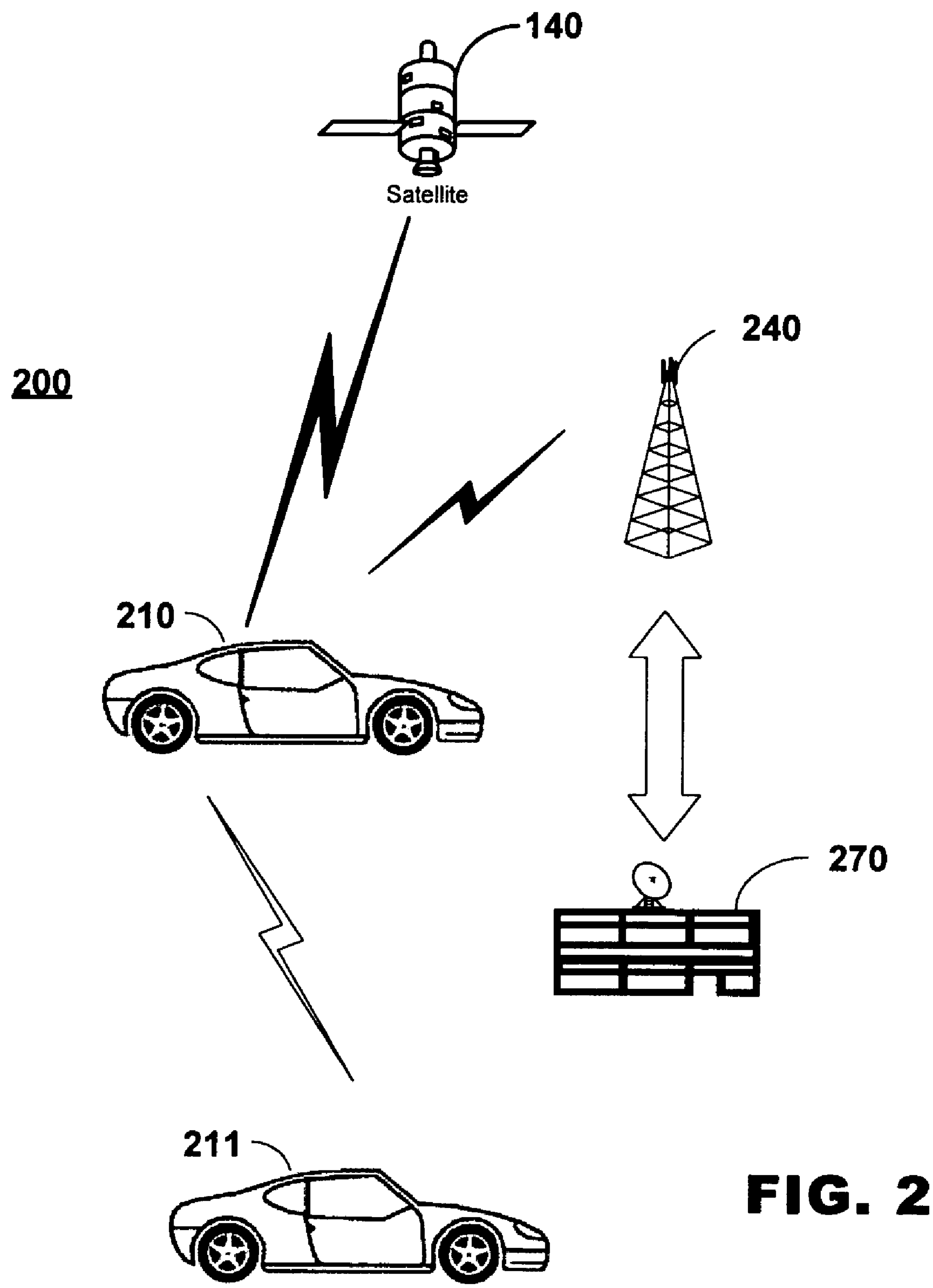
FIG. 2 is a block diagram illustrating an embodiment of a system for operating a degraded telematics unit, in accordance with the present invention.

FIG. 2 is a block diagram illustrating an embodiment of a system for operating a degraded vehicle communication unit. Mobile vehicle communication system (MVCS) 200 includes GPS satellite broadcast system 140, mobile vehicles (210, 211), one or more wireless carrier systems 240, and one or more call centers 270. In one embodiment, MVCS 200 may include additional components not relevant to the present discussion. Elements in FIG. 2 that are numbered identically to elements in FIG. 1 function in a substantially similar way.

In accordance with the present invention, each mobile vehicle (210, 211) is a vehicle communication unit includes a telematics unit (not shown) and a GPS unit (not shown) as described in FIG. 1, above. The telematics units includes hardware and software to operate in a primary communication mode, such as, for example the short message service, analog mobile telephone system, or digital mobile telephone system described in FIG. 1, above. The GPS unit includes hardware and software to receive GPS satellite broadcast as described in FIG. 1, above.

The telematics units within mobile vehicles (210, 211) further include hardware and software to implement additional wireless communication capabilities as defined by the U.S. Federal Communications Commission (FCC) in FCC Part 15 rules (47 CFR §15), such as, for example short range wireless technology or wireless networking technology. In one embodiment, each mobile vehicle (210, 211) within MVCS 200 is a node of a mobile ad hoc network (MANET), as is known in the art. The additional wireless communication capability is called a secondary communication mode. Operation in the secondary communication mode allows the telematics unit within one mobile vehicle to communicate, over short distances and utilizing significantly less power, with other mobile vehicles equipped with similar capabilities.

In an example, the telematics units within mobile vehicles (210, 211) further include hardware and software to implement the secondary communication mode that includes a short range wireless technology, such as, the Bluetooth standard, that uses a frequency of 2.45 gigahertz (GHz), established by international agreement for industrial, scientific, and medical devices (ISM) utilization as well as consumer utilization.

In another example, the telematics units within mobile vehicles (210, 211) further include hardware and software to implement the secondary communication mode that includes a wireless networking technology, such as, wireless Wide Area Network (WAN) technology and wireless Local Area Network (LAN) technology that is based on the Institute of Electronic and Electrical Engineers (IEEE) 802.11 series standard.

Mobile vehicle 210 represents a mobile vehicle within MVCS 200 having a fully functional telematics unit (not shown) that is able to communicate with wireless carrier system 240 as well as a fully functional GPS unit that is able to receive GPS satellite broadcast from GPS satellite broadcast system 140. The fully functional telematics unit within mobile vehicle 210 is able to operate in both the primary communication mode as well as the secondary communication mode.

In one embodiment, mobile vehicle 211 represents a mobile vehicle within MVCS 200 having a degraded telematics unit (not shown) that is not able to communicate with wireless carrier system 240. The degraded telematics unit within mobile vehicle 211 is unable to operate in the primary communication mode. The degraded telematics unit within mobile vehicle 211 is able to operate in the secondary communication mode. Examples of degradation of the telematics unit include degradation of one or more critical portions of the telematics unit, such as the antenna portion or the power supply portion of the telematics unit or the mobile vehicle. Scenarios of degradation of the primary communication mode include an automobile accident, vehicle theft, and the like. In the event of an automobile accident scenario, the degradation may be unintentional as opposed to an intentional degradation in the event of an automobile theft scenario.

In another example, a degraded telematics unit includes a telematics unit that is not equipped or designed to operate in the primary communication mode. In this example, the degraded telematics unit within mobile vehicle 211 is able to operate in the secondary communication mode, such as the 802.11 series standard or the Bluetooth standard described above. Note that in this example, the telematics unit is not degraded in the customary understanding of the word "degraded" but is rather "degraded" in that the primary communication mode is not enabled for the unit. Thus, in this application the word "degraded" and its derivatives is defined broadly and includes both telematics units that do not function as intended, and telematics unit that do not have the ability to communicate in the primary communication mode described herein.

In another embodiment, mobile vehicle 211 represents a mobile vehicle within MVCS 200 having a degraded GPS unit (not shown) that is unable to receive GPS satellite broadcast from GPS satellite broadcast system 140. In this embodiment, the GPS unit within mobile vehicle 211 may or may not be able to operate in the primary communication mode. Reasons for degradation of the GPS unit include degradation of one or more critical portions of the GPS unit, such as, for example the antenna portion or the power supply portion of the GPS unit or the mobile vehicle. This degradation may result from intentional or unintentional misuse, or other factors beyond control, such as weather.

In operation, upon determination of a primary communication mode failure, the telematics unit within mobile vehicle 211 initiates the secondary communication mode. In one embodiment, determination of the primary communication mode failure occurs when the telematics unit within mobile vehicle 211 can not initiate contact or maintain communication with the wireless carrier system 240. In another embodiment the telematics unit does not include the necessary hardware and software to initiate contact or maintain communication with the wireless carrier system 240, and in this embodiment, the determination of the primary communication mode failure is preordained as the telematics unit does not have the capability to operate in the primary communication mode defined herein. In another embodiment, determination of the primary communication mode failure occurs when the GPS unit within mobile vehicle 211 is unable to receive GPS satellite broadcast from GPS satellite broadcast system 140.

Upon initiation of the secondary communication mode, the telematics device is operated within the secondary communication mode. The secondary communication mode allows communication between a telematics unit within one mobile vehicle, over short distances and utilizing significantly less power, with other telematics units within mobile vehicles equipped with similar capabilities.

In one embodiment, communication between a telematics unit within mobile vehicle 211 utilizing a secondary communications mode includes communicating data to wireless carrier system 240 via a telematics unit within mobile vehicle 210 that is within MVCS 200. In another embodiment, communication between telematics units within mobile vehicle 211 utilizing a secondary communications mode includes receiving data from wireless carrier system 240 via a telematics unit within mobile vehicle 210 that is within MVCS 200. In yet another embodiment, data communicated or received includes error messages, emergency messages, and the like.

In another embodiment, the secondary communication mode is utilized to establish communication for distribution of standard messages.

Figure 3:
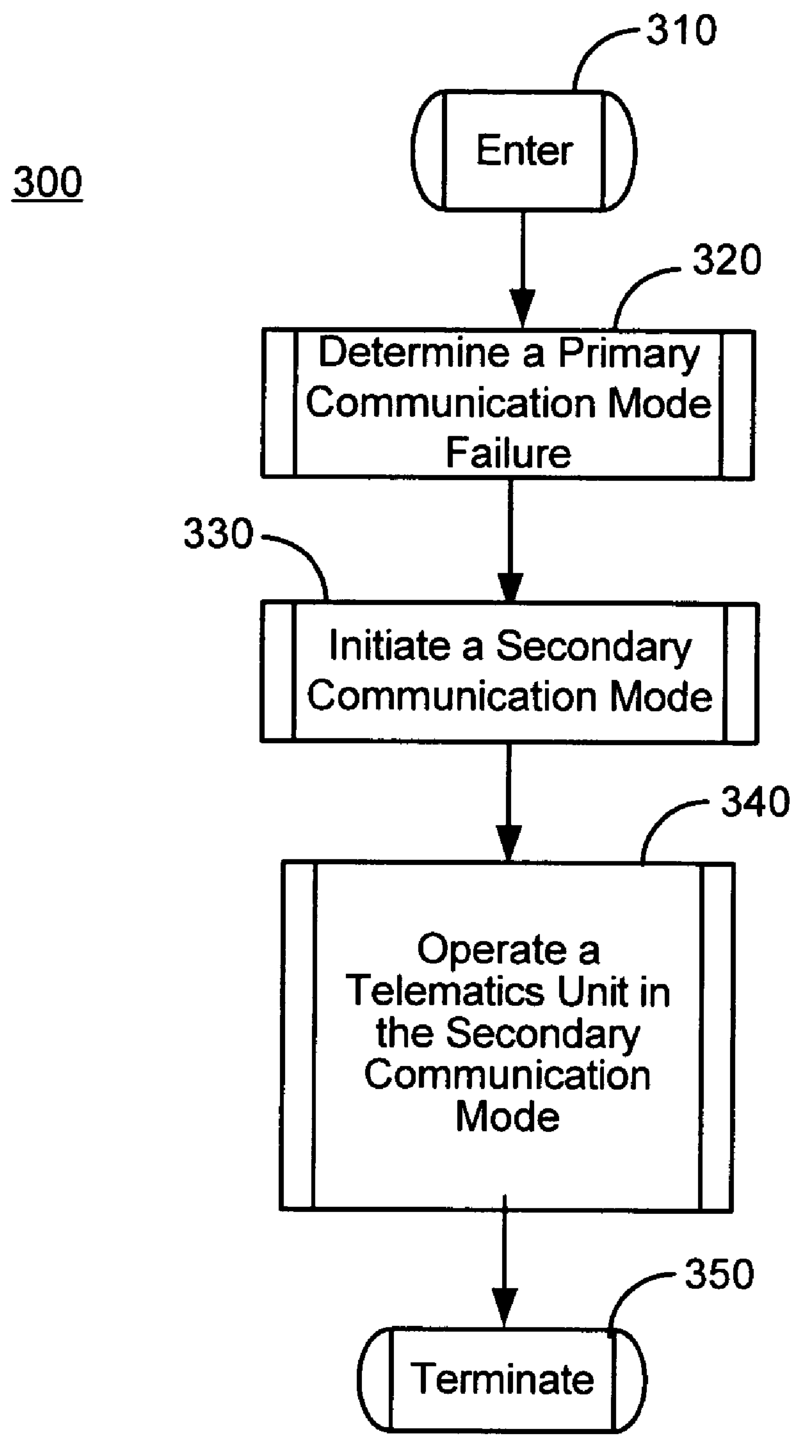
FIG. 3 is a flow diagram depicting an exemplary embodiment of a method of operating a degraded telematics unit, in accordance with the current invention.

FIG. 3 is a flow diagram depicting an exemplary embodiment of a method of operating a degraded vehicle communication unit. In FIG. 3, method 300 may utilize one or more systems detailed in FIGS. 1 and 2 above. The present invention can also take the form of a computer usable medium including a program for configuring an electronic module within a vehicle. The program stored in the computer usable medium comprises computer program code for executing the method steps described in FIG. 3.

In FIG. 3, method 300 begins at block 310. At block 320, a primary communication mode failure is determined. In one embodiment, the primary communication mode failure is determined by detecting whether the telematics unit can initiate contact with a wireless carrier system. In this embodiment, the primary communication mode failure is also determined if the telematics unit can not maintain communication with the wireless carrier system.

In an example and referring to FIG. 2 above, the primary communication mode failure is determined by detecting if the telematics unit within mobile vehicle 211 can not initiate contact with wireless carrier system 240. In this example, the primary communication mode failure is also determined if the telematics unit within mobile vehicle 211 cannot maintain communication with the wireless carrier system 240. In the above example, detecting whether the telematics unit can initiate contact with a wireless carrier system includes determining the telematics unit is not equipped or designed to operate in the primary communication mode.

In another embodiment, the primary communication mode failure is determined by determining a GPS unit within the vehicle communication unit is unable to receive a GPS satellite broadcast from a GPS satellite broadcast system. In an example and referring to FIG. 2 above, the primary communication mode failure is determined by detecting if the GPS unit within mobile vehicle 211 can not receive a GPS satellite broadcast from a GPS satellite broadcast system 140.

At block 330, a secondary communication mode is initiated responsive to the primary communication mode failure determination. In one embodiment, the secondary communication mode is a short range wireless technology. In an example, the short range wireless technology is Bluetooth standard as described in FIG. 2, above. In another embodiment, the secondary communication mode is a wireless networking technology. In an example, the wireless networking technology is IEEE 802.11 series standard as described in FIG. 2, above.

At block 340, the telematics device operates in the secondary communication mode. In one embodiment, operating the telematics device in the secondary communication mode includes communicating data to a wireless carrier system via a second mobile vehicle within the wireless carrier system. In an example and referring to FIG. 2 above, operating the telematics device in the secondary communication mode within mobile vehicle 211 includes communicating data to wireless carrier system 270 via mobile vehicle 210 that is a node within MVCS 200.

In another embodiment, operating the telematics device in the secondary communication mode includes receiving data from a wireless carrier system via a second mobile vehicle within the wireless carrier system. In an example and referring to FIG. 2 above, operating the telematics device in the secondary communication mode within mobile vehicle 211 includes receiving data from MVCS 200 via mobile vehicle 210 that is a node within MVCS 200.

At block 350, the method ends.

The above-described methods and implementation for operating a degraded vehicle communication unit within a mobile vehicle communication system (MVCS) are example methods and implementations. These methods and implementations illustrate one possible approach for operating a degraded vehicle communication unit within a mobile vehicle communication system (MVCS). The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

We claim:

1. A method for operating a vehicle communication unit within a mobile vehicle communication system, the method comprising:

attempting to operate in a primary communication mode using a vehicle communication unit on a first vehicle, wherein the communication unit is equipped to communicate in the primary communication mode;

detecting a primary communication mode failure;

initiating short range wireless communication between the first vehicle and a second vehicle responsive to the primary communication mode failure, wherein the second vehicle has a vehicle communication unit enabled to communicate in the primary communication mode;

transmitting data between the first vehicle and the second vehicle via the short range wireless communication; and communicating the data with a service provider via a wireless carrier system to request assistance for the first vehicle using the vehicle communication unit on the second vehicle.

2. The method of claim 1, wherein detecting the primary communication mode failure comprises:

detecting if the vehicle communication unit cannot initiate contact with a wireless carrier system; and detecting if the vehicle communication unit cannot maintain communication with the wireless carrier system.

3. The method of claim 1, wherein detecting the primary communication mode failure comprises determining that a GPS unit within the vehicle communication unit is unable to receive a GPS satellite broadcast from a GPS satellite broadcast system.

4. The method of claim 1, wherein the primary communication mode is a cellular wireless connection.

5. The method of claim 1, wherein the secondary communication mode is a wireless connection using a communication protocol selected from the group consisting of: IEEE 802.11 series standard, Dedicated Short Range Communication standard, and Bluetooth.

6. The method of claim 1, wherein the transmitting step further comprises communicating data from the first vehicle to the second vehicle via the secondary communication mode.

7. The method of claim 1, wherein the transmitting step further comprises communicating data from the second vehicle to the first vehicle via the secondary communication mode.

8. The method of claim 1, wherein the communicating step further comprises sending the transmitted data from the second vehicle to the wireless carrier system via the primary communication mode.

9. The method of claim 1, wherein the communicating step further comprises sending data from the wireless carrier system to the second vehicle via the primary communication mode.

10. A method for operating a vehicle communication unit within a mobile vehicle communication system, the method comprising:

attempting to operate a first vehicle communication unit on a first vehicle in a primary communication mode;

detecting a primary communication mode failure due to degraded equipment on the first vehicle;

initiating a second communication mode using a local wireless link between the first vehicle and a second vehicle responsive to the primary communication mode failure, wherein the second vehicle has a second vehicle communication unit configured to communicate using the primary communication mode;

sending a request for assistance for the first vehicle to a service provider via a wireless communication system using the second vehicle communication unit; and communicating data to complete the request for assistance between the first vehicle and the second vehicle using the second communication mode.

11. The method of claim 10, wherein detecting the primary communication mode failure comprises:

detecting if the first vehicle communication unit cannot initiate contact with a wireless carrier system; and detecting if the first vehicle communication unit cannot maintain communication with the wireless carrier system.

12. The method of claim 10, wherein detecting the primary communication mode failure further comprises determining that a GPS unit within the first vehicle is unable to receive a GPS satellite broadcast from a GPS satellite broadcast system.

13. The method of claim 10, wherein the primary communication mode is a cellular wireless connection.

14. The method of claim 10, wherein the secondary communication mode is a wireless connection using a communication protocol selected from the group consisting of: IEEE 802.11 series standard, Dedicated Short Range Communication standard, and Bluetooth.

15. The method of claim 10, wherein the sending step further comprises sending a request from the second vehicle to a wireless carrier system via the primary communication mode.

16. The method of claim 10, wherein the sending step further comprises receiving a response to the request at the second vehicle via the primary communication mode.

17. The method of claim 10, wherein the communicating step further comprises sending data from the first vehicle to the second vehicle via the secondary communication mode.

18. The method of claim 10, wherein the communicating step further comprises sending data to the first vehicle via the secondary communication mode from the second vehicle, wherein the second vehicle received the data from a wireless communication system in response to the request for assistance.

* * * * *